United States Patent
Faranso et al.

(12) 
(10) Patent No.: US 10,674,678 B1
(45) Date of Patent: Jun. 9, 2020

(54) FLOWER POT FOR TRANSPLANTATION

(71) Applicants: Robert Faranso, West Bloomfield, MI (US); Marc Faranso, West Bloomfield, MI (US)

(72) Inventors: Robert Faranso, West Bloomfield, MI (US); Marc Faranso, West Bloomfield, MI (US)

(*) Notice: Subject to any disclaimer, the term of this patent is extended or adjusted under 35 U.S.C. 154(b) by 130 days.

(21) Appl. No.: 15/948,373

(22) Filed: Apr. 9, 2018

(51) Int. Cl.
| | | |
|---|---|---|
| *A01G 9/08* | (2006.01) |
| *A01G 9/02* | (2018.01) |
| *F16B 21/06* | (2006.01) |
| *A45F 5/10* | (2006.01) |
| *B65D 85/52* | (2006.01) |
| *A01G 9/029* | (2018.01) |

(52) U.S. Cl.
CPC ............ *A01G 9/086* (2013.01); *A01G 9/026* (2013.01); *A01G 9/0299* (2018.02); *A45F 5/10* (2013.01); *B65D 85/52* (2013.01); *F16B 21/06* (2013.01)

(58) Field of Classification Search
CPC .... A01G 9/086; A01G 9/0295; A01G 9/0299; A01G 23/04
USPC .............................. 220/4.23, 4.22, 4.24, 4.21
See application file for complete search history.

(56) References Cited

U.S. PATENT DOCUMENTS

| | | | | |
|---|---|---|---|---|
| 411,739 A | * | 9/1889 | Thayer ................. | A01G 9/0295 47/73 |
| 610,156 A | * | 8/1898 | Mechwart ........... | A01G 9/0295 47/73 |
| 716,668 A | * | 12/1902 | Cheney ................. | B65D 85/52 47/72 |
| 1,776,375 A | * | 9/1930 | Russell .................... | A01G 9/02 47/73 |
| 3,132,791 A | | 5/1964 | Haysler | |
| 4,187,639 A | * | 2/1980 | Ono ......................... | A01G 7/00 220/4.22 |
| 4,216,622 A | * | 8/1980 | Hollenbach ............ | A01G 9/029 47/71 |
| 4,223,480 A | * | 9/1980 | Welty ..................... | A01G 9/026 47/65.6 |
| 6,732,880 B1 | * | 5/2004 | Nash, Sr. .................. | B65F 1/02 220/4.22 |
| 7,353,635 B2 | * | 4/2008 | Westrate ................ | A01G 23/04 206/423 |
| 9,010,020 B1 | * | 4/2015 | Slusher .................... | A01G 9/02 47/66.3 |
| 2006/0283852 A1 | * | 12/2006 | Greiner ..................... | B65F 1/06 220/4.22 |

FOREIGN PATENT DOCUMENTS

EP  1889536 A1 * 2/2008 .............. A01G 9/02

* cited by examiner

*Primary Examiner* — Kristen C Hayes
(74) *Attorney, Agent, or Firm* — Sanchelima & Associates, P.A.; Christian Sanchelima; Jesus Sanchelima

(57) ABSTRACT

The present invention provides a flower pot which may be easily opened to facilitate placing or removing of the potted plant therein. The flower pot has at least one of the sidewall divided into two sidewall portions, and an opposing sidewall is provided with a hinge arrangement to allow for separating the two sidewall portions from each other, such that a front of the flower pot is opened for convenient placing or removing of the potted plant inside therein as desired without damaging the plant. Further, a locking arrangement is provided to hold together the two sidewall portions after the transplantation operation has been performed.

7 Claims, 4 Drawing Sheets

FLOWER POT FOR TRANSPLANTATION

BACKGROUND OF THE INVENTION

1. Field of the Invention

The present disclosure generally relates to a pot or container for horticulture plantation; and more particularly to a pot or container adapted for transplantation of flowers and/or plants.

2. Description of the Related Art

Transplantation, also sometimes known as re-plantation, is a well-known technique of getting a grown plant to move from one place to another. Unlike seeds which have to sprout or cuttings which may have to develop roots, transplants already have healthy root systems and thus provide a quicker way for a person to expand his/her garden. In addition, when a plant in a flower pot has grown up to a certain extent, transplant has to be performed to move the plant from the original flower pot to a flower pot of a larger size as its root system expands to fill the available space within its container and further since the original flower pot structure may not able to receive any more soil to support plant's growth.

An important requirement for performing transplantation is the necessity of preventing the roots from getting damaged during the process. Because a plant might require transplanting several times between seedling and maturity, each time it is transplanted it suffers unnecessary trauma, as well as the risk of even death. There are some varieties of flower pots which are constructed from paper and other sheet material, and folded and bent in particular ways. Although conceivably these types of flower pots could be unfolded to free the plant from the soil inside, such process would involve disengaging the interlocking structure of the pot by pressing at various points; however, such process could possibly damage the potted plant due to application of pressure which is certainly not intended.

Applicant believes that a related reference corresponds to U.S. Pat. No. 3,132,791A (hereinafter referred to as '791 patent) which relates to a flower pot of the type which may be readily assembled from a single blank form. In particular, the '791 patent provides a flower pot and method of assembling the same wherein a flower pot body is formed from a strip of material, the strip stapled or otherwise secured along a seam to form a circular cross section tube, the bottom formed of a plurality of layers of overlapping flaps which could be engaged and disengaged from one another. The flower pot of the '791 patent may be disassembled to remove the plant by disengaging the flaps and opening the strip of material. However, such process may be cumbersome and further removing the bottom may lead a chance of plant getting dropped which could damage the same.

Other documents describing the closest subject matter provide for a number of more or less complicated features that fail to solve the problem in a convenient and efficient manner. There are no currently prevalent simple means of removing potted plants from their containers. None of these documents suggest the novel features of the present invention.

SUMMARY OF THE INVENTION

It is one of the main objectives of the present invention to provide a flower pot from which the potted plant may be readily removed without damaging or disturbing the plant.

It is another objective of the present invention to provide the flower pot which may be easily opened to facilitate removing of the potted plant therein.

It is yet another objective of the present invention to provide the flower pot which is inexpensive to manufacture.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
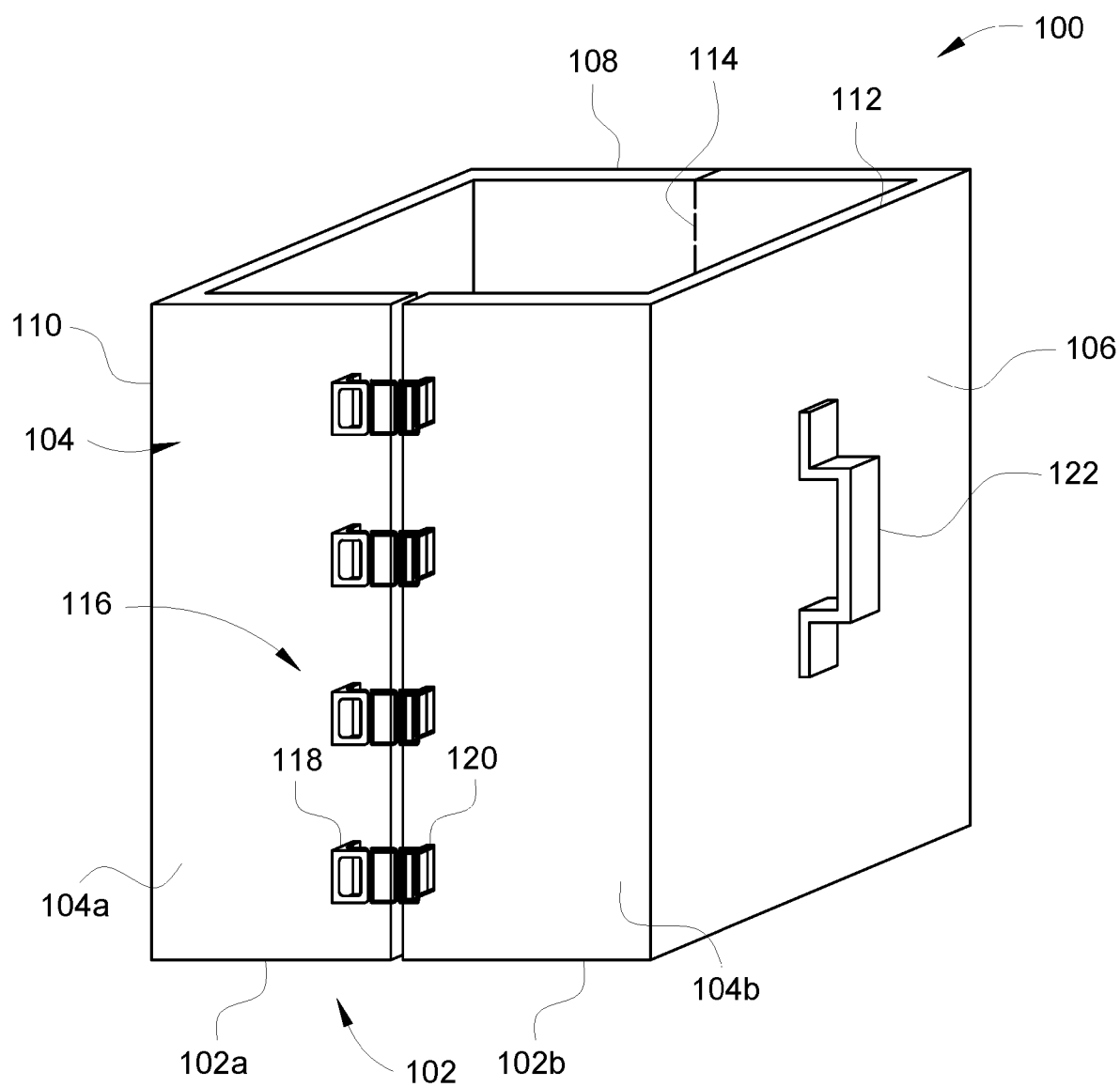
FIG. 1 illustrates a front perspective view of a flower pot in a closed configuration, in accordance with one or more embodiments of the present disclosure.

Referring to the drawings, FIG. 1 shows a diagrammatic perspective view of a flower pot (hereinafter referred to by the numeral 100), in accordance with an embodiment of the present disclosure. Although in the present embodiments the inventive structure has been called a "flower pot" and is described throughout the description to have a "flower plant" potted therein, it may be construed that the presently described pot structure may be used for planting any form of horticulture products including plants, flowers, vegetables, etc. without any limitations. Further, it should be noted that the term "plant" should be interpreted broadly to include floral arrangements, shrubbery, plants, foliage and any other form of vegetation.

Figure 2:
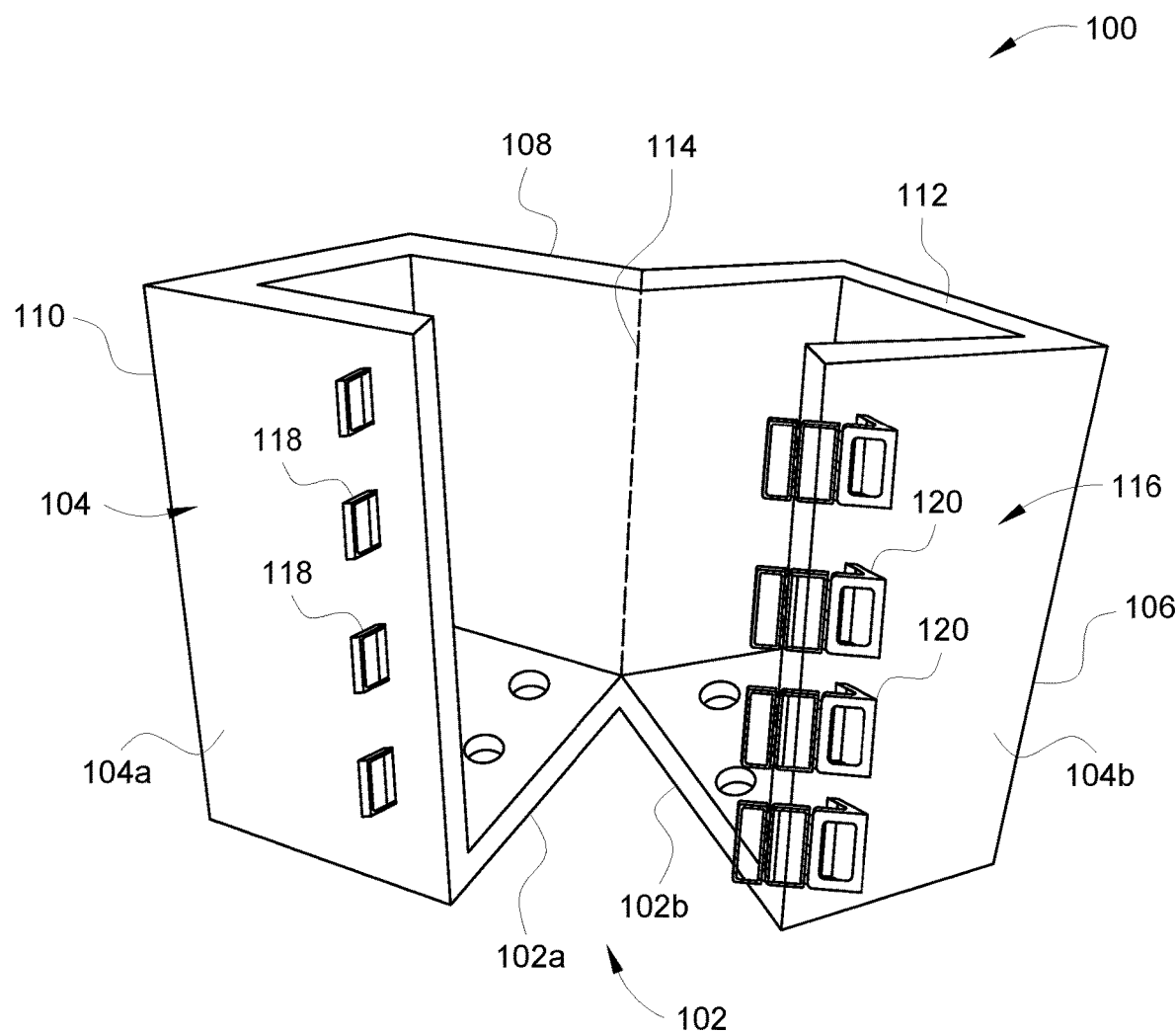
FIG. 2 illustrates a front perspective view of the flower pot in an opened configuration, in accordance with one or more embodiments of the present disclosure.
Figure 4:
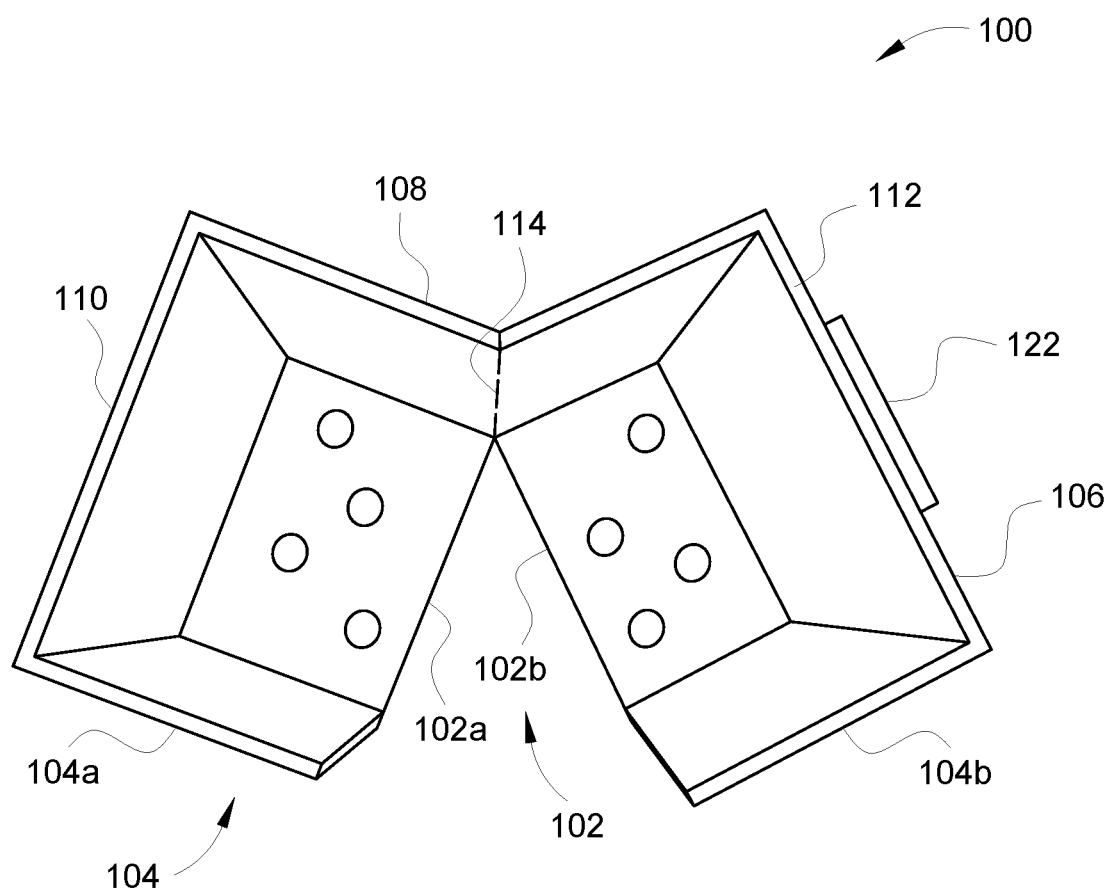
FIG. 4 illustrates a top perspective view of the flower pot in the opened configuration, in accordance with one or more embodiments of the present disclosure.

In one embodiment, the flower pot 100 is a substantially cubic shaped structure; however, it is envisioned that the flower pot 100 may have any other cross-sectional shapes, such as hexagonal, octagonal, and the like cross-sectional shapes without any limitations. The flower pot 100 includes a bottom wall 102 and four identical vertically extending sidewalls 104, 106, 108, 110 (herein, sometimes collectively referred to as "four sidewalls"). The bottom wall 102 along with the four sidewalls define an open top container having a top mouth edge 112. It may be construed that the bottom wall 102 is square shaped for imparting cubical shape to the flower pot 100, but other suitable shapes, such as hexagonal, octagonal or discoid for the bottom wall 102 are not excluded from the scope of the present disclosure. In some examples, the edges between the bottom wall 102 and the four sidewalls are beveled for safer handling of the flower pot 100. Further, in some examples, the bottom wall 102 may have a number of drain holes (as shown in FIG. 2 and FIG. 4), and may be adapted to even be used with a saucer if so desired.

The flower pot 100 of the present disclosure is designed to be suitable for transplantation of any potted plant therein. For this purpose, as illustrated with reference to combination of FIGS. 1-2, the flower pot 100 is configured to be openable about at least one of the four sidewalls, such as the sidewall 104 shown in FIG. 2. As illustrated, in one embodiment, the sidewall 104 is divided along a central axis into two portions 104a, 104b and similarly the bottom wall 102 is divided along a central axis into two portions 102a, 102b, respectively. Further, the sidewall 108 (opposing the sidewall 104) is divided along a central axis into two portions 108a, 108b. In an embodiment, the sidewall 108 is provided with a hinge arrangement 114 disposed along its central axis to connect the sidewall portions 108a, 108b in a manner to have a limited range or angle of rotation between them, when the hinge arrangement 114 is operated.

Figure 3:
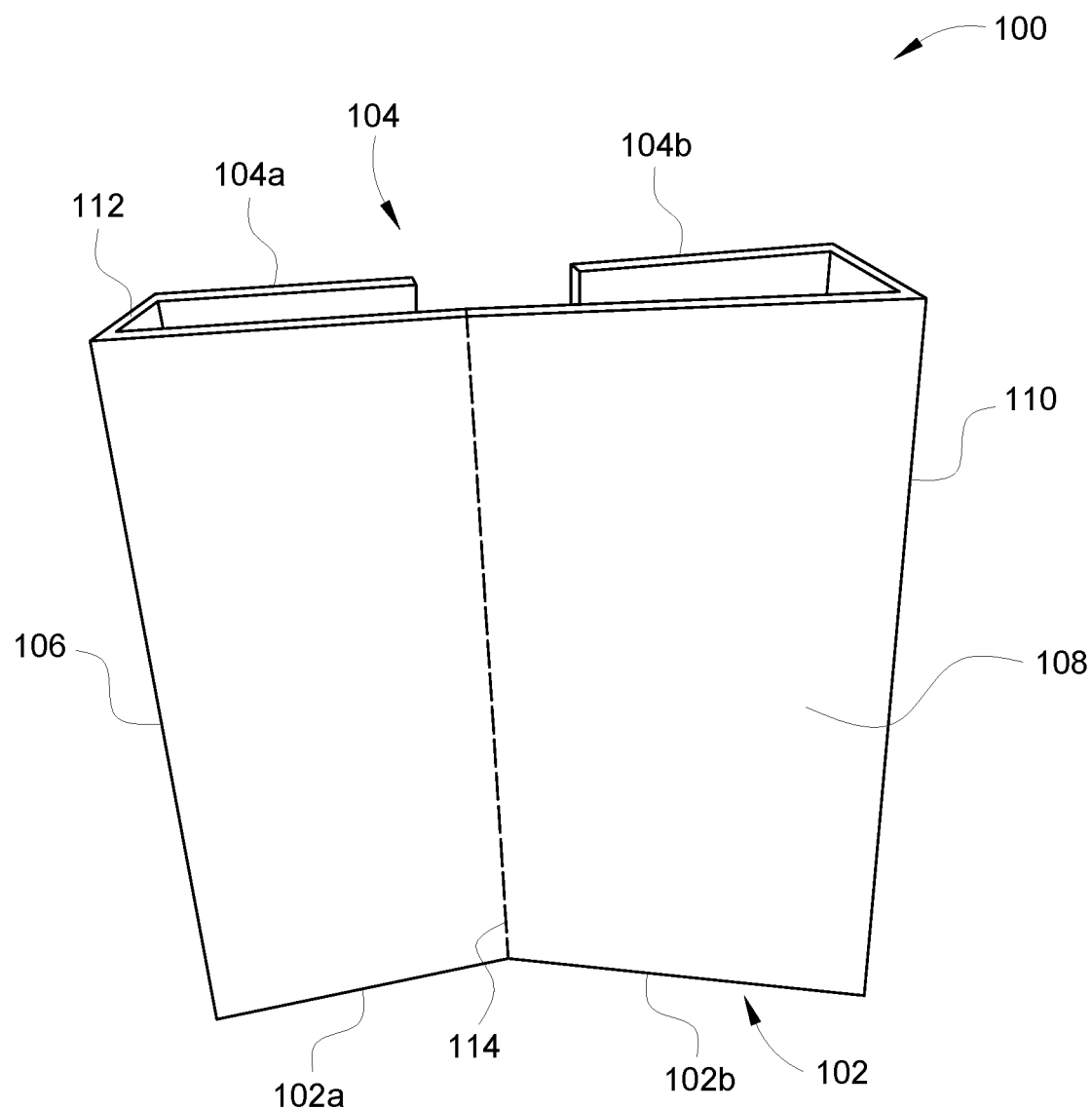
FIG. 3 illustrates a rear perspective view of the flower pot in the opened configuration, in accordance with one or more embodiments of the present disclosure.

In the flower pot 100 of the present disclosure, the hinge arrangement 114 may be such that when operated the sidewall portions 104a, 104b could be brought together to complete the sidewall 104 or separated to divide the sidewall 104 into the sidewall portions 104a, 104b, as desired. In the present example, as illustrated more clearly in FIG. 3, the hinge arrangement 114 may run along an entire height of the sidewall 108 (i.e. from the bottom wall 102 to the top mouth edge 112). In one example, as illustrated in the appended drawings, the hinge arrangement 114 may simply be a seam joint between the two sidewall portions 108a, 108b with enough strength so as to allow for relative rotational movement therebetween. In an alternate example, the hinge arrangement 114 may employ a hinge mechanical bearing for providing the relative rotational movement between the two sidewall portions 108a, 108b.

Further, in one embodiment, the flower pot 100 includes a locking arrangement 116 configured to hold the two sidewall portions 104a, 104b together when needed. In one example, as illustrated, the locking arrangement 116 includes anchors 118 (such as, in the form of brackets) provided on one of the two sidewall portions 104a, 104b, e.g. the sidewall portion 104a, and chains 120 (such as, in the form of hooks or loops) provided on other of the two sidewall portions 104a, 104b, e.g. the sidewall portion 104b. For locking, the two sidewall portions 104a, 104b are first brought together and the chains 120 on the sidewall portion 104b are engaged with the anchors 118 on the sidewall portion 104a to effectively latch the two sidewall portions 104a, 104b together. On the other hand, for unlocking, the chains 120 may be removed from the anchors 118 to free the two sidewall portions 104a, 104b from each other. It may be understood that the locking arrangement 116 described above is exemplary only and may include any form of locking methods for holding together the two sidewall portions 104a, 104b, including, but not limited to, for example, using one or more of deadbolts, clamps, fasteners, hooks, buttons, etc. without departing from the scope of the present disclosure.

It may be understood that the present flower pot 100, with the hinge arrangement 116 and the locking arrangement 118, may be opened along the sidewall 104 in order to gain access to an inside thereof. This allows for convenient and straightforward placing or removing of a plant or the like inside the flower pot 100. Although the flower pot 100 provides access to the inside from a top opening formed along the top mouth edge 112, but removing a plant from the inside of the flower pot 100 via such top opening may require pulling the plant out which could be damaging to the plant and especially the roots of the plant bounded to the soil inside therein. However, opening the flower pot 100 along the sidewall 104 (as depicted in FIG. 2 and FIG. 4) provides convenient and ample access from a front of the flower pot 100 which is much wider compared to the top opening and further allows for removing any plant from the inside of the flower pot 100 without having to pull its roots against the binding force with the soil.

In an example, the flower pot 100 may also include a handle 122 provided on any one of the two sidewalls 106, 110, e.g. the sidewall 106 as shown in the illustration of FIG. 1. The handle 122 may allow to conveniently carry the entire flower pot 100 assembly with ease. Alternatively, the handle 122 may be provided attached to the top mouth edge 112 for such carrying purposes. In some other examples, the flower pot 100 may also be provided with a cover or the like for the top opening to be placed over the top mouth edge 112 for covering the inside of the flower pot 100, for example, for periods when the flower pot 100 is not being in use.

In general, the flower pot 100 has a radially symmetrical geometry. In an exemplary embodiment, the flower pot 100 may have the bottom wall with approximate dimensions of 8 inches by 8" inches, and further the height of the four sidewalls is also approximately 8 inches, imparting the outer body with cubical shape. Alternatively, as discussed earlier, the flower pot 100 may have any one of a variety of more varied shapes, including cylindrical or frustoconical shape, and may have any suitable size without any limitations. Optionally, the flower pot 100 might be decorative in appearance. It should be specially noted that the present invention does not interfere with, or otherwise obscure the four sidewalls of the flower pot 100, thereby retaining the optional decorative appearance, if any.

In accordance with an embodiment, the flower pot 100 may be constructed of plastic or any similar material. Specifically, the flower pot 100 may be molded from plastic using any suitable conventionally known technique. Suitable materials to prepare the flower pot 100 might be chosen from such plastics, which may include, for example polyvinyl chloride, styrene, polypropylene, and various co-polymers. Since the flower pot 100 may generally be used outdoors, and being exposed to elements, like direct sunlight, wind, dust, etc., consideration may also be given to the addition of fillers and UV protection layers to add durability to the flower pot 100. It may further be recognized that the thickness of the plastic or other suitable material may be at least commensurate with the weight to be borne by the flower pot 100, when carrying growth media and potted plantation therein.

The present flower pot 100 has been designed such that the potted plant and the surrounding potting soil may be easily removed therefrom for transplantation purpose or the like without damaging the plant, and especially its roots structure. Therefore, the flower pot 100 facilitates the removal and transplantation of plants in a simple way designed to minimize damage to roots and retardation of growth due to the transplantation trauma. This makes the present flower pot 100 particularly suitable for novice people who wishes to undertake transplantation of the flowers or plants, say from a smaller pot to a bigger pot. Also with such easy front opening mechanism, the flower pot 100 can also be used to conveniently perform regular checking for health of the root of the plant potted therein. Further, since the flower pot 100 could be opened somewhat like a flat structure, this may further help with stacking multiple such units together for shipment purpose to save space and thereby shipping charges, and later could be assembled into cubic structure on site by utilizing the corresponding locking arrangement 116.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A potting container, comprising:
   a. a housing having an interior space, a front wall, a rear wall, a right side wall, a left side wall, a bottom side, and an entirely open top end, said top end configured to allow plant to extend outwardly from said housing;
   b. said front wall includes a clip assembly, said rear wall includes hinged members that cooperate with said clip assembly to provide access to said interior space to allow a plant to be removed from or placed therein;
   c. said bottom side includes a plurality of openings adapted to allow for the drainage of water located within said housing;
   d. said clip assembly includes male and female clip members, wherein said male and female clip members are buckle clips, said male clip members engage with said female clip members to securely close said front wall and bring said housing to its closed configuration; and
   e. said front wall defined by two panels that are connected together using said clip assembly, said male clip members mounted to one of said two panels and said female clip members mounted to the other panel, said bottom side defined by two bottom panels that are abutting in said closed configuration and are separated when said front wall panels are opened using said hinged members on said rear wall.

2. The potting container of claim 1 including a handle on said right or left side wall.

3. The potting container of claim 1 wherein said housing is a square.

4. The potting container of claim 1 wherein said housing is a rectangle.

5. The potting container of claim 1 wherein rear wall is a smooth surface.

6. The potting container of claim 1 wherein said openings have a diameter large enough to permit water to flow out of said housing.

7. The potting container of claim 1 wherein said hinged members are located longitudinally along the center of said rear wall.

\* \* \* \* \*